(12) United States Patent
Clark et al.

(10) Patent No.: US 9,127,622 B2
(45) Date of Patent: Sep. 8, 2015

(54) REVERSIBLE FLOW DISCHARGE ORIFICE

(75) Inventors: Jim A. Clark, Jupiter, FL (US); Craig W. Irwin, Jupiter, FL (US); Reed A. Kakuska, Juno, FL (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 845 days.

(21) Appl. No.: 13/300,775

(22) Filed: Nov. 21, 2011

(65) Prior Publication Data
US 2013/0125527 A1    May 23, 2013

(51) Int. Cl.
*F02K 9/56* (2006.01)
*F16L 55/027* (2006.01)

(52) U.S. Cl.
CPC ............... *F02K 9/566* (2013.01); *F16L 55/027* (2013.01)

(58) Field of Classification Search
CPC ............. F16L 55/027; G01F 1/42; F15D 1/14
USPC .......................... 239/127.1, 127.3; 138/40, 44
See application file for complete search history.

(56) References Cited

U.S. PATENT DOCUMENTS

| | | | | |
|---|---|---|---|---|
| 1,744,842 A | * | 1/1930 | Suverkrop et al. | 138/44 |
| 1,857,321 A | * | 5/1932 | Nemec | 137/385 |
| 2,456,626 A | * | 12/1948 | Dahnke | 138/44 |
| 2,582,814 A | * | 1/1952 | Beman et al. | 73/147 |
| 2,670,011 A | * | 2/1954 | Bertin et al. | 138/44 |
| 3,859,853 A | * | 1/1975 | Khuzaie | 73/861.64 |
| 3,894,562 A | * | 7/1975 | Moseley et al. | 138/44 |
| 4,174,734 A | * | 11/1979 | Bradham, III | 138/39 |
| 4,644,974 A | * | 2/1987 | Zingg | 138/44 |
| 4,753,114 A | * | 6/1988 | Jones et al. | 73/861 |
| 5,174,113 A | * | 12/1992 | Deville | 60/309 |
| 5,421,209 A | * | 6/1995 | Redus et al. | 73/861.04 |
| 6,505,648 B1 | * | 1/2003 | Gergely et al. | 137/828 |
| 7,086,417 B2 | * | 8/2006 | De Almeida | 138/44 |
| 7,434,401 B2 | | 10/2008 | Hayashi | |
| 7,832,212 B2 | | 11/2010 | Bunker | |
| 8,147,124 B1 | * | 4/2012 | Glanville | 366/338 |

* cited by examiner

*Primary Examiner* — Gerald L Sung
(74) *Attorney, Agent, or Firm* — Carlson, Gaskey & Olds, P.C.

(57) ABSTRACT

A rocket engine fluid-flow system includes a pump fluidly interconnecting a fluid source to a combustion chamber. A nozzle is in fluid communication with the combustion chamber and includes coolant tubes fluidly arranged between the pump and the combustion chamber. An orifice has a throat and is fluidly arranged between the pump and the coolant tubes. The orifice has entrance and exit ramps arranged on either side of the throat. The exit ramp has an exit ramp surface with a divergent angle that is less than a right angle. The entrance ramp provides a smooth approach to the orifice throat. In one example, the exit ramp includes an exit ramp surface having a divergent angle of 20-60°. The exit ramp radius is less than twice the throat radius in one example.

7 Claims, 2 Drawing Sheets

REVERSIBLE FLOW DISCHARGE ORIFICE

This invention was made with government support under Contract No. RH7-028016 awarded by the United States Air Force. The Government has certain rights in this invention.

BACKGROUND

This disclosure relates to a reversible-flow discharge orifice, for example, for use in a rocket engine fluid-flow system, such as a fuel system.

One type of rocket fuel system includes a pump that provides fuel, such as liquid hydrogen, to a combustion chamber. The pumped fuel passes through a discharge orifice before being provided to coolant tubes surrounding a nozzle that is downstream from the combustion chamber.

One typical discharge orifice provides a flow resistance that allows the fuel pump to meet the engine's design parameters for combustion chamber pressure and propellant mixture-ratio range during steady-state operation. Typical discharge orifices used in such applications have a well-rounded entrance, a constant-diameter throat and a squared-off trailing edge having a ninety-degree, sharp corner, which provide a repeatable, non-recoverable pressure drop for the flow of liquid hydrogen from the pump to the coolant tubes.

During an engine shutdown procedure, the flow rate of liquid hydrogen through the discharge orifice is reversed. Typically, a shutoff valve, which is arranged downstream from the coolant tubes and before the combustion chamber, is closed and the hydrogen flow is reversed to evacuate the hydrogen from the system, including the coolant tubes.

SUMMARY

A fluid flow system is provided that includes an orifice having a throat. The orifice includes entrance and exit ramps adjoining either side of the throat. The entrance ramp provides a smooth approach to the orifice throat. The exit ramp includes an exit ramp surface having a divergent angle of 20-60°. An exit ramp radius adjoins the exit ramp surface at a location near the throat. The exit ramp radius is less than twice the throat radius.

A rocket engine fluid flow system includes a pump fluidly interconnecting a fluid source to a combustion chamber. A nozzle is in fluid communication with the combustion chamber and includes coolant tubes fluidly arranged between the pump and the combustion chamber. An orifice has a throat and is fluidly arranged between the pump and the coolant tubes. The orifice has entrance and exit ramps arranged on either side of the throat. The exit ramp has an exit ramp surface with a divergent angle that is less than a right angle.

A method of managing fluid flow within a fuel system includes the steps of flowing fluid through an orifice in a first direction to a combustion chamber. A shutdown sequence is initiated. The flow through the orifice is reversed to a second direction that is opposite the first direction. The flow through the orifice in the second direction provides a desired low pressured drop across the orifice during the shutdown sequence.

BRIEF DESCRIPTION OF THE DRAWINGS

The disclosure can be further understood by reference to the following detailed description when considered in connection with the accompanying drawings wherein.

DETAILED DESCRIPTION

Figure 1:
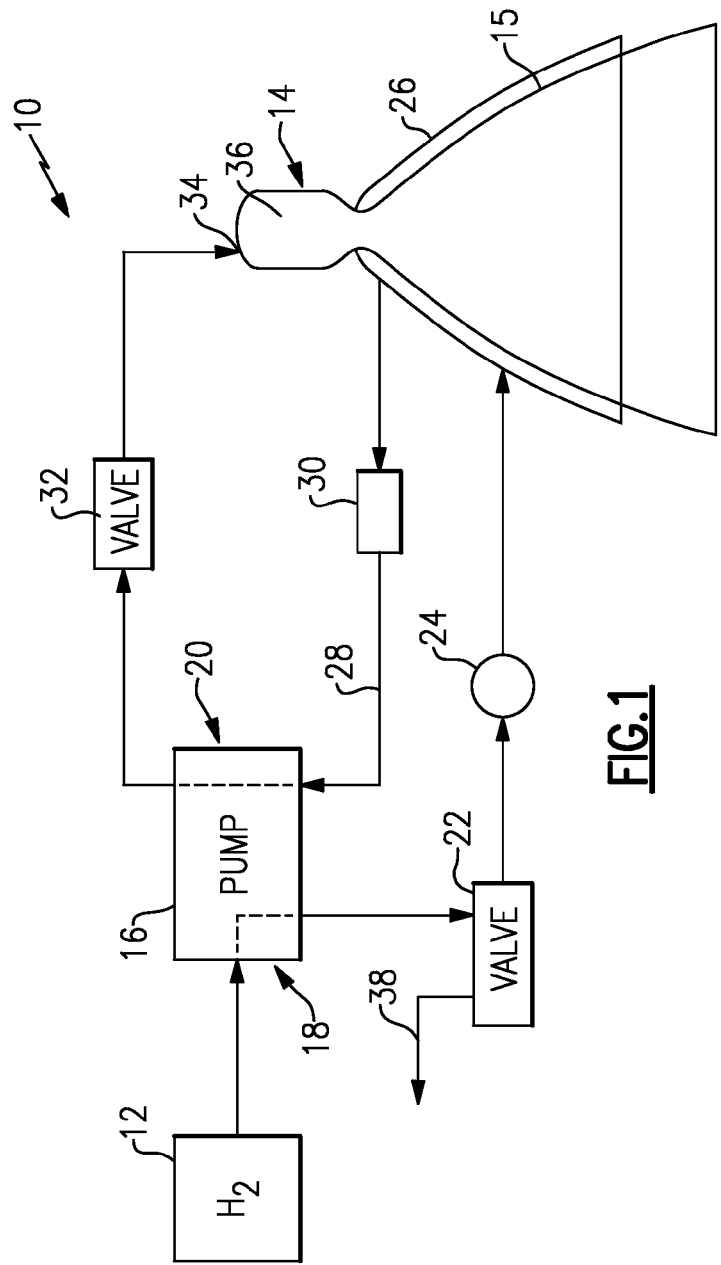
FIG. 1 is a schematic view of a rocket engine fluid flow system.

A rocket engine fuel flow system 10 is schematically illustrated in FIG. 1. The system 10 includes a fuel supply 12, such as liquid hydrogen, that is provided to an engine 14. In one example, a fuel pump 16 includes first and second stages 18, 20. Fuel flows from the pump discharge through an orifice 24 to coolant tubes 26. The orifice 24 creates a significant pressure loss, unlike a venturi, and it produces flow separation that provides stable flow. The discharge valve 22 also includes a vent 38 which is normally blocked during steady-state operation.

The engine 14 includes a nozzle 15 attached to a combustion chamber 36. A fuel and an oxidant, such as hydrogen and oxygen are combusted in the combustion chamber 36 and expelled through the nozzle 15.

The walls of the combustion chamber and nozzle are comprised of coolant tubes. The hydrogen vaporizes in the coolant tubes 26. During steady-state operation of the engine, the fuel is pumped through the orifice 24 then through the coolant tubes 26 then through the turbine then through the shutoff valve 32, which is open, to an injector 34. The injector 34 provides the gaseous hydrogen to the combustion chamber 36 where it is mixed with oxygen and combusted.

During steady-state operation fluid flows through the system 10 in the direction indicated by the arrows in FIG. 1. The discharge valve 22 has an open position, which is described above with respect to the steady-state operation. During shutdown, it is desirable to evacuate the fuel from the system 10, including the coolant tubes 26.

Figure 2:
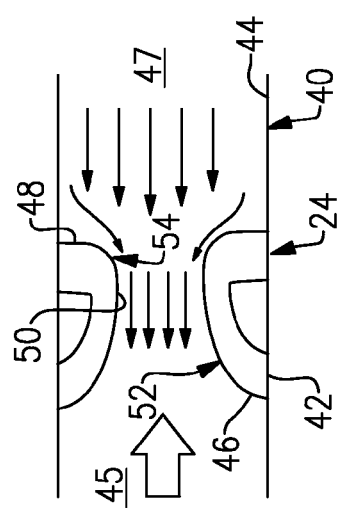
FIG. 2 is a schematic view of a fluid flow system, including an example of the disclosed reversible-flow discharge orifice.
Figure 3:
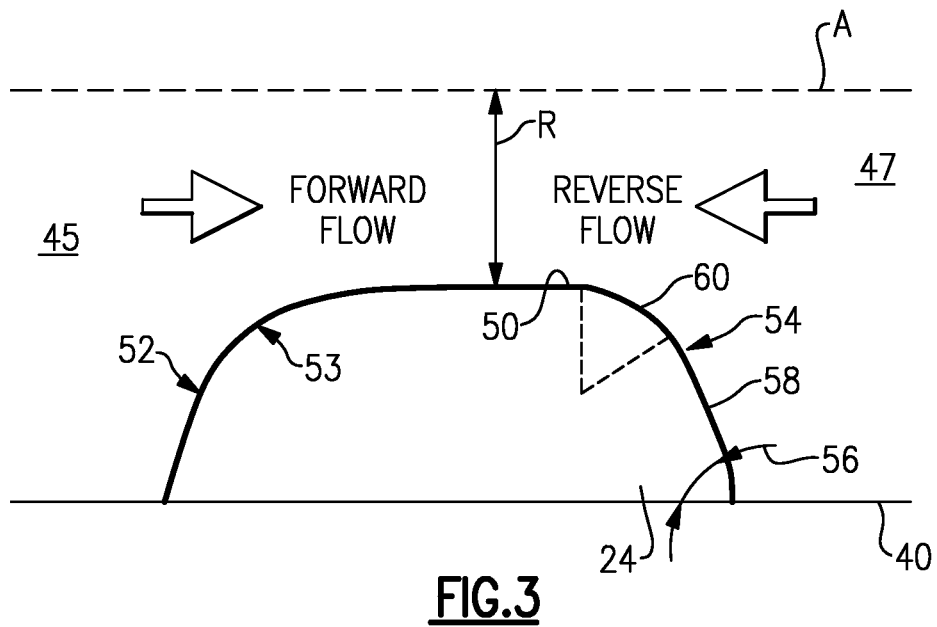
FIG. 3 is an enlarged view of the reversible-flow discharge orifice shown in FIG. 2.

During the shut-down sequence, the main shutoff valve 32 is closed and the hydrogen fuel flow direction between the pump and the shutoff valve is reversed. The discharge valve 22 is actuated to a vented position to fluidly connect the coolant tubes 26 with the vent 38, which is open to atmosphere. The fuel flow is reversed through the system 10, including through the orifice 24. It is desirable to minimize the pressure drop across the orifice during reverse flow The orifice 24 is illustrated in more detail in FIGS. 2 and 3. In FIG. 2, steady-state flow is indicated by the large arrow, and reverse flow is indicated by the clusters of small arrows. The orifice 24 is arranged within an inner diameter 44 of a tube 40 through which the fluid flows. An outer diameter 42 of the orifice 24 engages the tube inner diameter 44. The orifice 24 includes a throat 50 having a throat radius R relative to a flow axis A. Entrance and exit ramps 52, 54 are provided on either side of the throat 50. In particular, the entrance ramp 52 includes a convergent radius 53 and provides a smooth entrance 46 to the orifice throat during steady-state operation. Conversely, the exit ramp 54 includes a divergent angle 48 that is arranged on a downstream side 47 during steady-state operation.

The prior art square-cornered exit resulted in a high pressure differential between the interior of the combustion chamber 36 and the coolant tubes 26 during shutdown. The exit ramp end 48 is less than a right angle, for example, rounded slightly, to reduce resistance during reverse flow without compromising desired flow separation during steady-state forward flow. The exit ramp 52 includes an exit ramp surface 58 arranged at a divergent angle 56, for example, 20-60°, relative to the orifice centerline. An exit ramp radius 60 adjoins and is tangent to the exit ramp surface 58 and is tangent to the throat 50. The exit ramp radius 60 is less than twice the dimension of the throat radius R, in one example, to avoid flow-increasing diffusion in the steady-state flow direction and is also less than the entrance-ramp radius 53.

Figure 4:
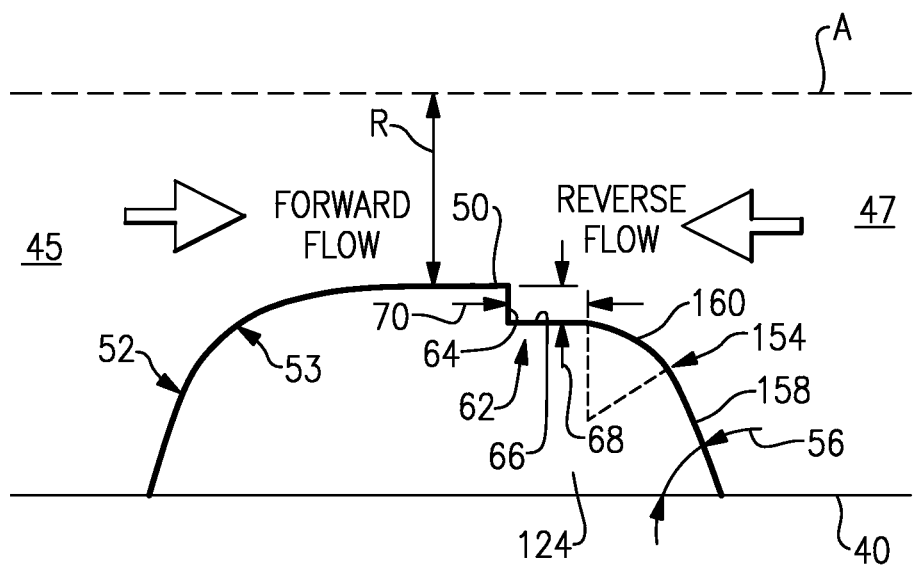
FIG. 4 is another example of a reversible-flow discharge orifice.

Referring to FIG. 4, another example exit ramp 154 is illustrated, which enhances flow separation in the steady-state (forward) flow direction. The orifice 124 includes an annular step 62, which is ninety degrees in one example, provided by first and second surfaces 64, 66 that adjoin one another. The first and second surfaces 64, 66 respectively provide a depth 68 from the throat 50 and a length 70 from the first surface 64 to the exit ramp radius 160. The step 62 is large enough to enable consistent flow separation during steady-state (forward) flow, yet small enough to enable low pressure drop when the flow through the orifice is reversed. In one example, the annular-step depth 68 is 25 mils (0.64 mm), and the length 70 is at least twice the depth 68. An exit ramp surface 158 adjoins and is tangent to the exit ramp radius 160, which is tangent to the second surface 66.

In operation, the fuel flow within a fuel system is managed by flowing fluid through the orifice 24 in a first direction (indicated by the arrows in FIG. 1) to the combustion chamber 36. Desired flow resistance is maintained through the orifice 24. A shut-down sequence is initiated, by a controller, for example, when fuel is no longer desired at the combustion chamber 36. The fuel flow is reversed through the orifice 24. The flow though the orifice 24 in the reverse direction provides a desired low pressure drop across the orifice 24 during the shut-down sequence.

Although an example embodiment has been disclosed, a worker of ordinary skill in this art would recognize that certain modifications would come within the scope of the claims. For that reason, the following claims should be studied to determine their true scope and content.

What is claimed is:

1. A fluid flow system comprising:
   an orifice providing a throat having a throat radius, the orifice including entrance and exit ramps adjoining either side of the throat, the entrance ramp providing a smooth approach to the orifice throat, and the exit ramp including an exit ramp surface having a divergent angle of 20-60° and an exit ramp radius adjoining the exit ramp at a location near the throat, the exit ramp radius less than twice the throat radius;
   a shut-off valve having open and closed positions;
   a pump fluidly connected to the shut-off valve by a fluid passage, wherein a tube is arranged in the fluid passage, the tube includes the orifice; and
   wherein the pump is configured to convey a fluid through the orifice in a first direction with the shut-off valve in the open position, the fluid flows from the entrance ramp to the exit ramp in the first direction, and the pump is configured to reverse the flow of fluid through the orifice to a second direction opposite the first direction with the shut-off valve in the closed position.

2. The fluid flow system according to claim 1, wherein the exit ramp radius adjoins the throat.

3. The fluid flow system according to claim 1, wherein the exit ramp includes an annular step radially outward from the throat, the annular step adjoining the exit ramp radius.

4. The fluid flow system according to claim 3, wherein the annular step adjoins the throat.

5. The fluid flow system according to claim 3, wherein the annular step is provided by first and second surfaces respectively providing a depth and a length, the length being at least twice the depth.

6. A method of managing fluid flow within a fuel system comprising the steps of:
   providing a shut-off valve having open and closed positions;
   providing a pump fluidly connected to the shut-off valve by a fluid passage, wherein a tube is arranged in the fluid passage, the tube includes an orifice;
   pumping fluid through the orifice in a first direction to a combustion chamber with the shut-off valve in the open position, wherein the orifice has entrance and exit ramps, the fluid flows from the entrance ramp to the exit ramp in the first direction, the entrance ramp facing upstream in the first direction flow, and the exit ramp facing upstream in the second direction flow, the exit ramp including an exit ramp surface having a divergent angle of 20-60°, wherein the exit ramp and a throat includes an exit ramp radius adjoining the exit ramp surface and near the throat of an orifice that includes a throat radius, the exit ramp radius less than twice the throat radius;
   initiating a shut-down sequence; and
   pumping the fluid in reverse through the orifice to a second direction opposite the first direction with the shut-off valve in the closed position, wherein the flow though the orifice in the second direction provides a desired low pressure drop across the orifice during the shut-down sequence.

7. The method according to claim 6, wherein the exit ramp includes an annular step arranged axially between the exit ramp radius and the throat.

\* \* \* \* \*

UNITED STATES PATENT AND TRADEMARK OFFICE
CERTIFICATE OF CORRECTION

PATENT NO. : 9,127,622 B2  Page 1 of 1
APPLICATION NO. : 13/300775
DATED : September 8, 2015
INVENTOR(S) : Jim A. Clark et al.

It is certified that error appears in the above-identified patent and that said Letters Patent is hereby corrected as shown below:

IN THE CLAIMS:

In claim 6, column 4, line 31; between "ramps" and "," insert --and a throat--

In claim 6, column 4, line 36; after "ramp" delete "and a throat"

Signed and Sealed this
Ninth Day of February, 2016

Michelle K. Lee
*Director of the United States Patent and Trademark Office*